United States Patent
Wright

(10) Patent No.: US 10,368,563 B1
(45) Date of Patent: Aug. 6, 2019

(54) EDIBLE WICKS, CANDLES, CONFECTIONS AND RELATED METHODS

(71) Applicant: Tara C. Wright, Rosedale, NY (US)

(72) Inventor: Tara C. Wright, Rosedale, NY (US)

(*) Notice: Subject to any disclaimer, the term of this patent is extended or adjusted under 35 U.S.C. 154(b) by 0 days.

(21) Appl. No.: 15/678,604

(22) Filed: Aug. 16, 2017

Related U.S. Application Data

(63) Continuation-in-part of application No. 12/631,442, filed on Dec. 4, 2009, now abandoned.

(60) Provisional application No. 61/215,565, filed on May 8, 2009.

(51) Int. Cl.
| | | |
|---|---|---|
| A23G 3/00 | (2006.01) | |
| A23G 3/34 | (2006.01) | |
| A23G 3/54 | (2006.01) | |

(52) U.S. Cl.
CPC ............ *A23G 3/343* (2013.01); *A23G 3/545* (2013.01); *A23V 2002/00* (2013.01)

(58) Field of Classification Search
CPC .. F23D 3/24; A23G 1/50; A23G 1/507; A23G 1/00; A23G 3/00; A23G 1/30
See application file for complete search history.

(56) References Cited

U.S. PATENT DOCUMENTS

| | | |
|---|---|---|
| 1,958,462 A | 5/1934 | Baumer |
| 3,860,731 A | 1/1975 | Forkner |
| 6,099,877 A | 8/2000 | Schuppan |
| D542,945 S | 5/2007 | Johnson |
| 2007/0072139 A1 | 3/2007 | Xenakis et al. |

FOREIGN PATENT DOCUMENTS

| | | | |
|---|---|---|---|
| GB | 2437520 | 10/2007 | |
| JP | 63042652 | 2/1988 | |
| JP | 2000251528 | 9/2000 | |
| KR | 1020010079733 | 8/2001 | |
| WO | WO-9303624 A1 * | 3/1993 | ............... A23G 3/28 |

OTHER PUBLICATIONS

WO 93/03624, Carmona Vallejo, Mar. 1993.*
Derwent abstract. Fujita et al. JP63042652, Feb. 1988.
Alford et al., "Home Baking: The Artful Mix of Flour and Traditions from Around the World", Artisan, 2003, p. 416 (2 pages).
(Continued)

*Primary Examiner* — Hong T Yoo
(74) *Attorney, Agent, or Firm* — K&L Gates LLP

(57) ABSTRACT

In part, the disclosure relates to various confections and edibles. In some embodiments, nuts are selected and processed to create an edible wick suitable for use in various confections such as edible chocolate, candy, cake or cookie candles. Other confections can be created using the embodiments disclosed herein including cupcakes, candle sticks, piñata cakes, lollipops, candies, wicks, combinations of the foregoing and others. Thus, in one embodiment, a completely edible, non-toxic candle is presented. The candle includes a body and a wick, both comprised of edible materials. The natural oils of the edible wick provide a flammable fuel capable of sustaining a prolonged flame. The melted by-product of the burned candle remains edible and non-toxic for ingestion.

8 Claims, 18 Drawing Sheets

(56) References Cited

OTHER PUBLICATIONS

Parratore, "Wacky Science: A Cookbook for Elementary Teachers", Second Edition, Kendall/Hunt Publishing Company, 1998, p. 98 (3 pages). https://books.google.com/books?id+twiraBmrCtEC&pg=PA98&dq=almond+sliver+and+candle+wick&hl=en&sa=X&ved=0ahUKEwi5ltHF2fvRAhUlOiYKHQWuAbYQ6AEIQDAE#v=onepage&q=almond%20sliver%20and%20candle%20wick&f=false.
International Written Opinion for PCT/US2010/032763; completed on Dec. 29, 2010; dated Dec. 29, 2010 (3 pages).

* cited by examiner

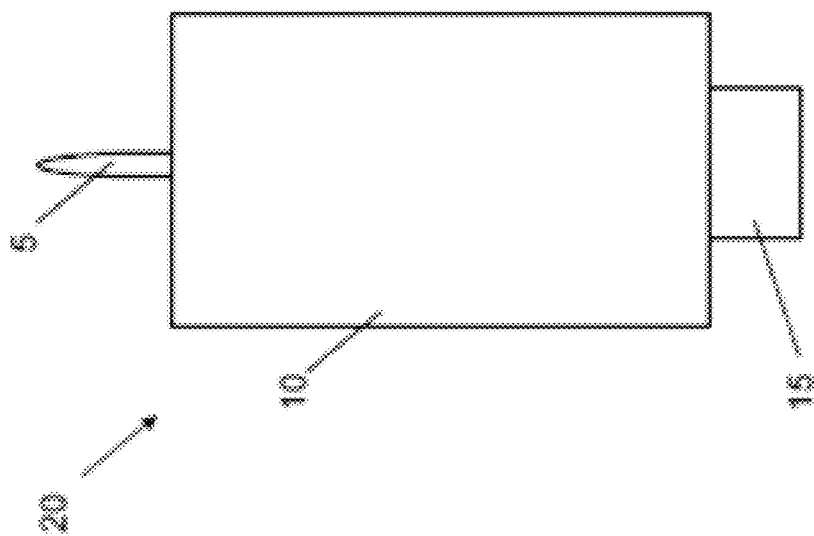

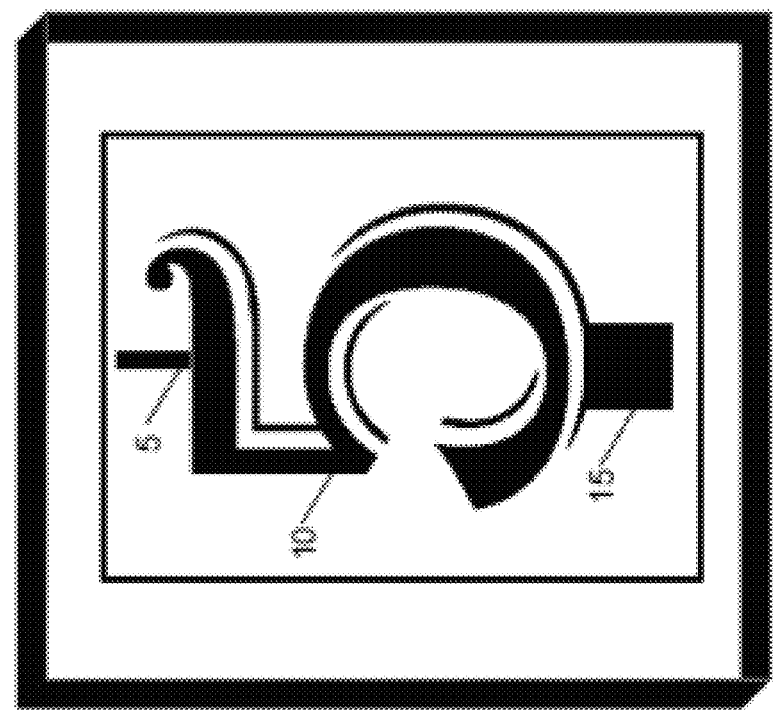
Fig. 3

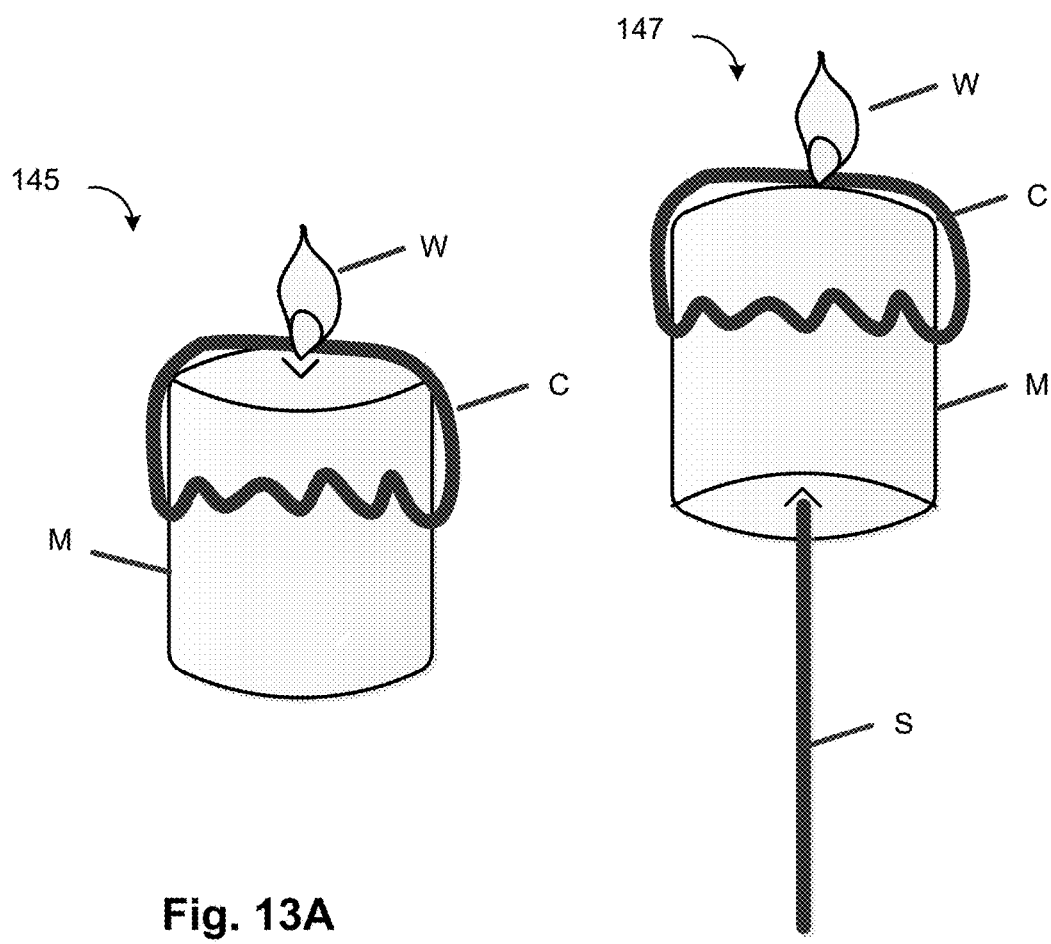
Fig. 13A
Fig. 13B
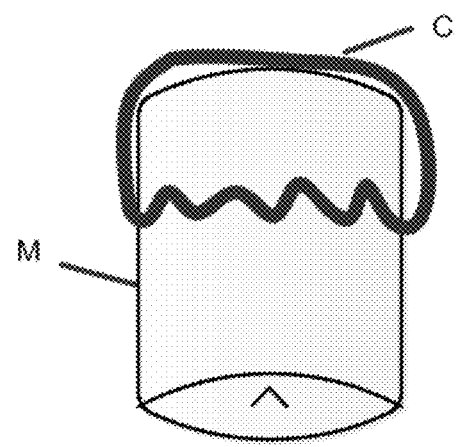
Fig. 13C

EDIBLE WICKS, CANDLES, CONFECTIONS AND RELATED METHODS

CROSS REFERENCE TO RELATED APPLICATIONS

This application claims priority to and the benefit of U.S. Provisional Patent Ser. No. 61/215,565 filed May 8, 2009, and is a continuation-in-part of U.S. patent application Ser. No. 12/631,442 filed Dec. 4, 2009; the disclosures of both applications are herein incorporated by reference in their entirety.

FIELD OF INVENTION

The invention generally relates to decorative confectionaries, and more specifically to an edible candle with an edible wick.

BACKGROUND

Traditional decorative candles, such as those used in cakes, cupcakes, and other baked goods, are made of a wax body and a flammable wick. It is customary to decorate cakes, pies, cupcakes, cookies, ice cream and other food or non-food products at festive occasions to celebrate various events, such as birthdays, weddings, anniversaries, graduations, retirements and holidays, using candles. A traditional wick functions to deliver fine streams of a burnable fuel, such as wax, by capillary action. The wax surrounding the wick burns and drips down the remaining body of the candle and onto the product on which the candle is placed. If the product holding the candle is a food product or other edible material, the wax can render the food inedible leading to wasted food products. The wax drippings also create an unpleasant appearance on the surface of the food product, which is often finely decorated with icing or other toppings. Removal of the wax drippings may also destroy the decorative and aesthetic features of the food product. Children often attempt to lick or eat the candles when removed from the food product, which can lead to the dangerous ingestion of wax, or other inedible materials creating a safety hazard. The wax drippings of a traditional candle require significant effort to remove the candle, drippings and any other residue.

What is needed therefore is a candle and a wick which addresses the deficiencies described above and is safe to eat for humans and animals.

SUMMARY OF THE INVENTION

In a first aspect, a method of manufacturing an edible candle is provided. In some embodiments, the method may include, for example, forming a molded candle body comprising a solidified edible material, forming a divot configured on an upper surface of the elongate molded candle body, wherein the upper surface is formed from the solidified edible material, selecting an elongate slice of a nut as an edible wick, cutting the elongate slice of the nut to create additional surfaces to prolong burn time, configuring the elongate slice of the nut in the divot, and forming an edible embeddable base extending from the molded candle body and unitary therewith, the edible embeddable base molded from the solidified edible material. In some embodiments, the method further comprises cutting the elongate slice of the nut to form a plurality of angled sides to provide additional surface area for easier lighting and a prolonged flame.

In various embodiments, the molded candle body is elongate, cylindrical, cupcake-shaped, cake-shaped, square, round, and any other suitable geometric shape. In various embodiments, the body of a given candle is formed to define an inner chamber for disposing confections, toys, and prizes such that when the candle is smashed the toys are revealed. In some embodiments, the candle body is elongate.

In some embodiments, the solidified material of the molded candle body comprises chocolate, vanilla, strawberry, cake, cookie, ice cream, frozen yogurt, or a frozen fruit. In other embodiments, the solidified material of the molded candle body comprises marshmallow or ganache. In other embodiments, the solidified material of the molded candle body comprises cakes or cookies for animals made from honey, carrots, pumpkin, peanut butter, tuna, egg whites, cheese, minced chicken, or sweet potatoes. In some embodiments, the molded candle body may also include flavorings. In some embodiments, the edible wick may be a nut such as an almond, cashew, hazelnut, macadamia, pecan, pistachio and walnut. In other embodiments, the edible wick comprises soy or tofu. In some embodiments, the edible wick is heated prior to configuring the edible wick to the elongate molded candle body. Alternatively, in some embodiments, the edible candle is molded into a lollipop shape.

In other embodiments, the method of manufacturing an edible candle may include forming a body from an edible liquid material in a mold comprising a first body portion of a cavity and a divot, a portion of the divot extending beyond the cavity, and the edible liquid poured into the first body portion of the cavity in the mold, affixing an edible wick comprising a seed to the body by placing a seed in the divot of the mold, forming an edible embeddable base in the mold, wherein the edible embeddable base is disposed below the body of the edible candle and formed as part of the edible candle, and hardening the edible liquid until the body and the edible embeddable base are solid and the seed is affixed to the body by the hardening of the edible liquid. In some embodiments, the edible liquid material comprises flavoring.

In some embodiments, the flavor of the edible liquid material may be selected from a group comprising milk chocolate, dark chocolate, white chocolate, fudge, cherry chocolate, mint chocolate, mocha chocolate, orange, apple, pineapple, mango tangerine, cherry, melon, plum, apricot, peach, lemon, lime, cranberry, boysenberry, raspberry, strawberry, blackberry, blueberry, grape, coconut or banana, peppermint spearmint, almond amaretto, walnut, pecan, pistachio, hazelnut or peanut mocha, vanilla, butterscotch, rum and liqueur. In some embodiments, the edible candle may be decorated with edible gold dust, colored or metallic sugar sprinkles, sugar pearls and colored liquid chocolate. In some embodiments, the method comprises shaping the seed to form a decorative shaped wick and to release oils from the edible wick material. In some embodiments, the shape of the decorative wick is selected from the group including a crescent-shaped wick, a tear drop-shaped wick, and a tree-shaped wick. In some embodiments, the decorative wick may be selected from a group comprising almond, cashews, hazelnuts, macadamias, pecans, pistachios, and walnuts.

In another aspect, an edible candle is provided. The edible candle comprises an molded candle body comprising a solidified edible material, a divot configured on an upper surface of the molded candle body, wherein the upper surface is formed from the solidified edible material, an edible wick comprising a slice of a nut fixedly disposed in the divot, wherein the slice of the nut comprises a tip and a base, may be a sliver that tapers from the base to the tip, and is cut with a plurality of angled sides to provide additional surface area, and an edible embeddable base extending from the molded candle body and unitary.

In some embodiments, the edible embeddable base comprises the solidified edible material. In some embodiments, solidified edible material comprises chocolate, cake, cookie, ice cream, frozen yogurt and frozen fruit-bar. In some embodiments, the width of the edible embeddable base may be narrower than a width of the molded candle body. In some embodiments, a melted by-product which results from heat from burning the edible wick remains edible and non-toxic for ingestion. In some embodiments, the edible wick comprises an almond. In other embodiments, the edible wick may be selected from a group comprising almond, cashews, hazelnuts, macadamias, pecans, pistachios, and walnuts. In some embodiments, the edible wick comprises a sliver of a nut. In other embodiments, the edible wick comprises soy or tofu.

In some embodiments, the solidified edible material comprises a flavor. In some embodiments, the flavor may be selected from a group consisting of milk chocolate, dark chocolate, white chocolate, fudge, cherry chocolate, mint chocolate, mocha chocolate, orange, apple, pineapple, mango tangerine, cherry, melon, plum, apricot, peach, lemon, lime, cranberry, boysenberry, raspberry, strawberry, blackberry, blueberry, grape, coconut or banana, peppermint spearmint, almond amaretto, walnut, pecan, pistachio, hazelnut or peanut mocha, vanilla, butterscotch, rum, and liqueur. In some embodiments, the solidified edible material may be decorated with edible gold dust, colored or metallic sugar sprinkles, sugar pearls and colored liquid chocolate. In some embodiments, the wick is heated prior to affixing to the elongate molded candle body.

In some embodiments, the elongate molded the body is may be of a shape selected from a group consisting of a number, character, symbol, letter, and figurine. In other embodiments the edible candle may be configured into a lollipop shape. In some embodiments, a set of flat or 3D molds may be created to combine into a single object including, but not limited to, a doll house, a box, an instrument, and various plants or trees. In some embodiments, wick is a decorative shaped wick. In some embodiments, the decorative shape of the edible wick may be selected from a group consisting of a crescent-shaped wick, a tear drop-shaped wick, and a tree-shaped wick. In some embodiments, the edible wick further comprises an edible material treated with an edible oil. In some embodiments, the edible wick may be heated prior to configuring it to the elongate moldable body.

In one aspect the disclosure relates to edible wicks and edible candles. In one embodiment, the disclosure relate to an edible candle. The edible candle may include a molded candle body comprising a solidified edible material; a divot defined by an upper surface of the molded candle body, wherein the upper surface is formed from the solidified edible material; an edible wick comprising a portion of a nut disposed in the divot, wherein the portion of the nut comprises a tip and a base, wherein the portion of the nut tapers from the base to the tip, wherein the portion of the nut has been cut to define a plurality of angled sides to provide additional surface area, wherein the portion of the nut has been toasted to release flammable oils, wherein the portion of the nut has been scored to define a plurality of scored regions.

In one embodiment, the candle body defines a fillable hollow inner cavity, wherein the cavity comprises one or more confections or toys disposed therein. In one embodiment, the candle may include an edible stick, wherein the stick comprises rolled phyllo dough and an edible coating disposed therein, wherein the candle is supported by the stick. In one embodiment, the solidified edible material comprises a flavor, wherein the flavor is selected from a group consisting of milk chocolate, dark chocolate, white chocolate, fudge, cherry chocolate, mint chocolate, mocha chocolate, orange, apple, pineapple, mango tangerine, cherry, melon, plum, apricot, peach, lemon, lime, cranberry, boysenberry, raspberry, strawberry, blackberry, blueberry, grape, coconut or banana, peppermint spearmint, almond amaretto, walnut, pecan, pistachio, hazelnut or peanut mocha, vanilla, butterscotch, rum, and liqueur.

In one embodiment, the nut has been air dried for a time period that ranges from about 30 minutes to about 120 minutes prior to affixing to the molded candle body. In one embodiment, the time period is about 24 hours. In one embodiment, the time period is between about 24 hours and 48 hours. In one embodiment, the candle further comprises an edible embeddable base extending from the molded candle body, wherein the edible embeddable base comprises the solidified edible material, wherein the solidified edible material comprises chocolate, wherein a width of the edible embeddable base is narrower than a width of the molded candle body, and wherein a melted by-product which results from heat from burning the edible wick remains edible and non-toxic for ingestion. In one embodiment, the plurality of scored regions ranges from about 3 scored regions to about 10 scored regions.

In another aspect, the disclosure relates to a method of manufacturing an edible candle. The method includes forming an elongate molded candle body comprising a solidified edible material; forming a divot configured on an upper surface of the molded candle body, wherein the upper surface formed is from the solidified edible material; electing an elongate slice of a nut as an edible wick; cutting the elongate slice of the nut from facets across a surface of the nut; scoring the elongate slice of the nut in a plurality of surface locations of the slice of the nut; toasting the scored elongate nut; and exposing the nut to air for an exposure time that ranges from about 30 minutes to about 120 minutes prior to affixing to a confection.

In one embodiment, the slice of nut is a sliver of an almond. In one embodiment, the method includes cutting the elongate almond sliver to form a plurality of angled sides to provide additional surface area for easier lighting and a prolonged flame. In one embodiment, the method includes heating the edible wick prior to affixing the edible wick to the molded candle body.

In yet another aspect, the disclosure relates to an edible candle. The edible candle may include a molded candle body comprising a solidified edible material; a divot configured on an upper surface of the molded candle body, wherein the upper surface is formed from the solidified edible material; an edible wick comprising an slice of a nut fixedly disposed in the divot, wherein the slice of the nut is cut to provide additional surface area for easier lighting and a prolonged flame; and an edible embeddable base extending from the molded candle body and unitary therewith, the edible embeddable base molded from the solidified edible material, wherein the solidified material comprises chocolate, and wherein a width of the edible embeddable base is narrower than a width of the molded candle body.

In one embodiment, the slice of nut is a sliver of an almond. In one embodiment, the solidified edible material is selected from the group consisting of cake, cookie, ice cream, frozen yogurt and frozen fruit-bar. In one embodiment, the body is molded in to a shape selected from the group consisting of a number, character, symbol, letter and figurine. In one embodiment, the wick is a decorative shaped wick selected from the group consisting of a crescent shaped wick, a tear drop shaped wick, and a tree shaped wick. In one embodiment, the wick is heated prior to affixing to the body. In one embodiment, the wick further comprises a shaped edible material treated with an edible oil, wherein the wick is scored and faceted.

In yet another aspect, the disclosure relates to an edible candle. The edible candle may include a solidified edible material; a divot configured on an upper surface of the molded candle body, wherein the upper surface is formed from the solidified edible material; an edible wick disposed in the divot, wherein the edible wick is an almond sliver, the almond sliver is cut or shaped with various angled sides to provide additional surface area for easier lighting and a prolonged flame, wherein the almond sliver is scored at a plurality of locations, wherein the almond sliver is toasted; and a cavity defined by the molded candle body, wherein the cavity is fillable with one or more confections or toys. The candle may include, in one embodiment, an edible embeddable base extending from the molded candle body and unitary therewith, the edible embeddable base molded from the solidified edible material, wherein the solidified material comprises chocolate, wherein a width of the edible embeddable base is narrower than a width of the molded candle body. In one embodiment, the facets of formed in the edible wick ranges from about 10 to about 20. In one embodiment, the scoring regions of the edible wick range from about 3 to about 15.

BRIEF DESCRIPTION OF THE DRAWINGS

These embodiments and other aspects of this invention will be readily apparent from the detailed description below and the appended drawings, which are meant to illustrate and not to limit the invention, and in which:

FIG. 2 is a representation of the combustion of a flammable decoration, such as a candle, in accordance with an embodiment of the invention.

FIG. 3 is a three-dimensional mold of an Arabic numeral in accordance with an embodiment of the invention.

FIGS. 13A and 13B are exemplary marshmallow-based confections that include an edible wick according to an illustrative embodiment.

FIGS. 13C and 13D are exemplary marshmallow-based confections according to an illustrative embodiment.

DETAILED DESCRIPTION

The invention will be more completely understood through the following detailed description, which should be read in conjunction with the attached drawings. Detailed embodiments of the invention are disclosed herein, however, it is to be understood that the disclosed embodiments are merely exemplary of the invention, which may be embodied in various forms. Therefore, specific functional details disclosed herein are not to be interpreted as limiting, but merely as a basis for the claims and as a representative basis for teaching one skilled in the art to variously employ the invention in virtually any appropriately detailed embodiment.

Embodiments of the present invention include a completely (or partially) edible, non-toxic candle. The candle includes a body and a wick, both comprised of edible materials. In one embodiment, the natural oils of the edible wick provide a flammable fuel capable of sustaining a prolonged flame. The melted by-product of the candle (which results from the heat from the burning wick) remains edible and non-toxic for ingestion. In some embodiments, the edible candle is made for ingestion by animals a comprise of material that is edible and non-toxic for animals including, but not limited to, dogs, cats, various species of birds, and horses.

Figure 1C:
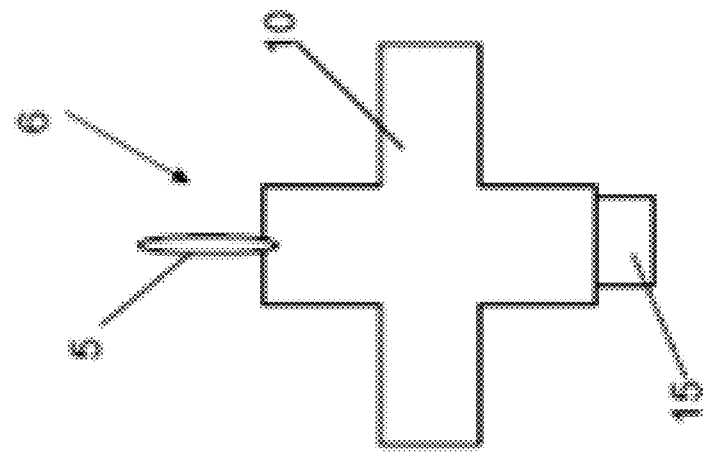
FIGS. 1A-C are cross-sections of an edible candles in accordance with an embodiment of the invention.
Figure 1B:
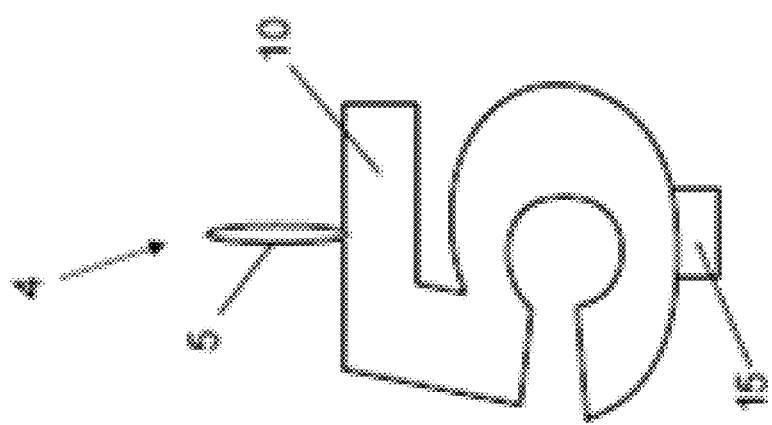
Figure 1A:
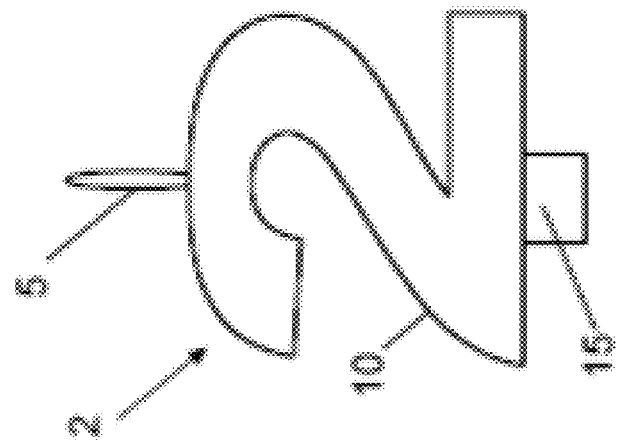

Turning now to FIGS. 1A-C, three exemplary designs of edible candles in accordance with an embodiment of the invention are depicted. FIG. 1A is a candle 2 molded in the shape of the number "2" having a wick 5, a body 10 and a base portion 15. The base portion 15 provides a base for the candle to be embedded in the surface of a food product without covering or submerging the body of the candle so the body may be easily seen. FIGS. 1B and 1C depict illustrative shapes of a number "5" 4 and a plus sign 6 as decorative candles having similar wicks 5, bodies 10 and bases 15. A plus sign candle is further detailed in U.S. Pat. No. D542,945, the entire disclosure of which is incorporated by reference herein. FIG. 2 depicts a two-dimensional view of a cylindrical candle 20 having a wick 5, body 10 and base 15.

According to one embodiment of the invention, the body includes a solid, hollow, or partially solid, molded chocolate form. The chocolate may begin in a liquid form and be poured into a mold where the liquid will solidify and take the shape of the mold as it hardens. FIG. 3 depicts one such mold 30 for a candle in the shape of the Arabic numeral '5' in accordance with an embodiment of the invention. The mold may be a rectangular shape with a cavity forming the body 10 of the numeral. The base 15 and the wick 5 are also part of the molding shape to provide a unitary body with a sturdier composition than that of a multi-piece candle assembled after solidification. Molds in the shape of letters, numbers and symbols may also be used to create distinct candle shapes from edible materials. In some embodiments, a set of flat or 3D molds may be created to combine into a single object including, but not limited to, a doll house, a box, an instrument, and various plants or trees.

In some embodiments the molds may be used to create a hot chocolate candle body. Tempered melted chocolate is poured into these molds. The chocolate may be sprinkled with one of a group of edible items such as nuts, marshmallows, or peppermints. The nuts sprinkled in the chocolate will act as an edible wick, and can be lit. Once formed, these chocolate candles may be added to a hot liquid such as milk, water, or coffee. When the candle body melts, the hot liquid will become a chocolate-flavored drink such as hot chocolate.

Figure 4:
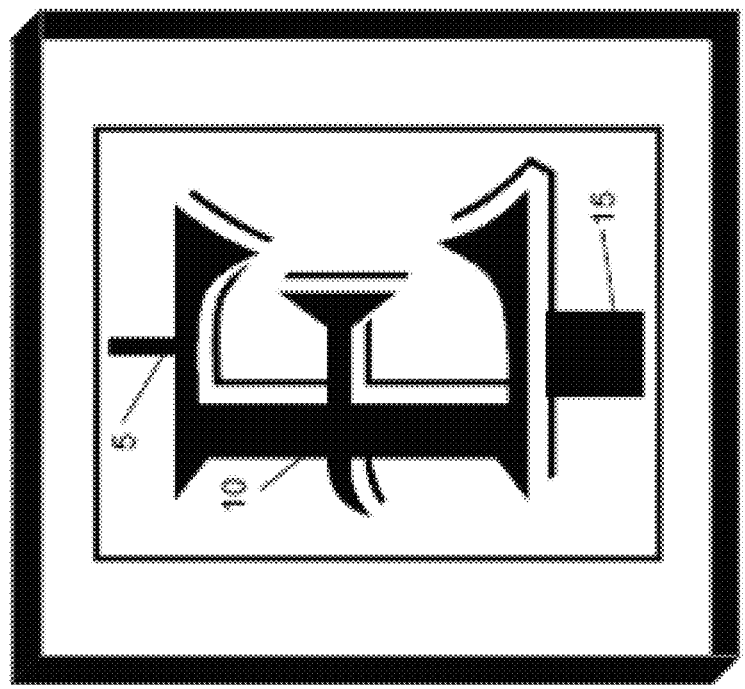
FIG. 4 is a three-dimensional mold of a Roman letter in accordance with an embodiment of the invention.
Figure 5:
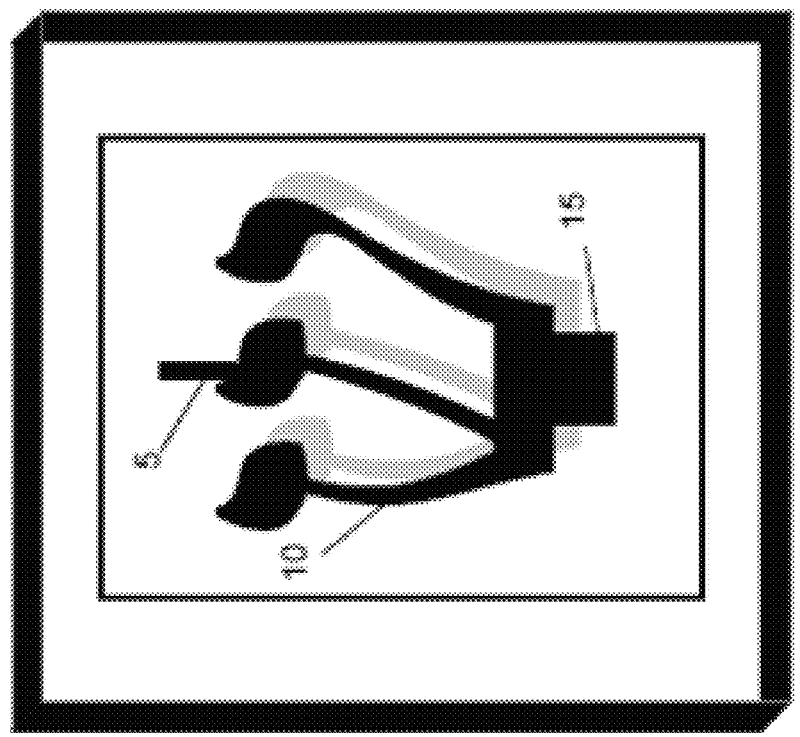
FIG. 5 is a three-dimensional mold of a Hebrew character in accordance with an embodiment of the invention.
Figure 6:
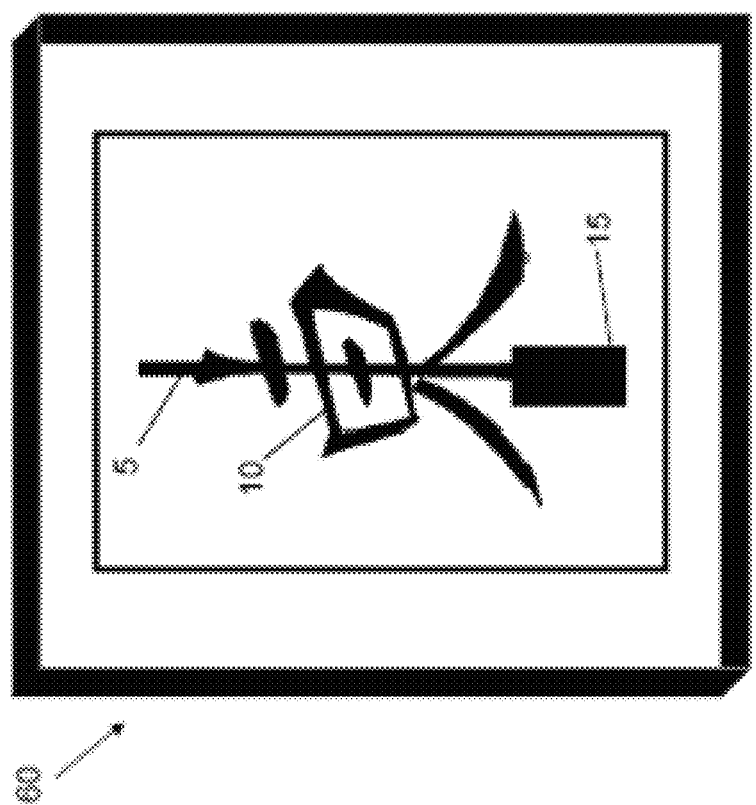
FIG. 6 is a three-dimensional mold of a Chinese character in accordance with an embodiment of the invention.

FIG. 4 depicts a three-dimensional mold 40 of the letter 'E' while FIG. 5 depicts a three-dimensional mold 50 of the Hebrew character '𝒲'. FIG. 6 depicts a Chinese character mold 60 according to one embodiment of the invention. One skilled in the art should recognize that characters or symbols of any language may be created without deviating from the scope of the invention and the embodiments described herein are merely illustrative examples.

The body 10 may also include additional flavoring or wick-supporting edible material such as milk-chocolate, dark-chocolate, white chocolate, fudge, cherry chocolate, mint chocolate, or mocha chocolate, or any combination thereof. Alternatively, according to one embodiment, fruit-flavoring may be added to the liquid chocolate, or body material, to enhance the flavor. Examples of fruit flavorings may include, but are not limited to orange, apple, pineapple, mango tangerine, cherry, melon, plum, apricot, peach, lemon, lime, cranberry, boysenberry, raspberry, strawberry, blackberry, blueberry, grape coconut or banana, or any combination thereof. Mint flavors, such as peppermint or spearmint, as well as nut-based flavors such as, almond amaretto, walnut, pecan, pistachio, hazelnut or peanut may be used for additional flavoring.

Additional flavor additives may be included, such as coffee flavors, like mocha, or other spice or liqueur flavorings, such as vanilla, butterscotch, or rum. In some embodiments, the body 10 may be decorated with edible gold dust, colored or metallic sugar sprinkles, sugar pearls and colored liquid chocolate. In some embodiments, the body 10 may be decorated with edible gold dust, colored or metallic sugar sprinkles, sugar pearls and colored liquid chocolate.

While the above embodiment is described having a chocolate body, one skilled in the art should recognize that other edible materials may be used to form the body. According to one embodiment of the invention, the body of the edible candle may be created using vanilla, or strawberry based liquids that solidify to form the body.

In another embodiment of the invention, the body of the candle may be hollow or partially hollow. Flavored or textured fillings may be added to the hollow portion of the body. For example, fillings may include, without limitation, ganache, pop candy, marshmallow, or caramel.

In some embodiments, the wick 5 comprises an edible wicking material is used to provide and sustain the fuel of a candle. In some embodiments, the wick 5 may provide and sustain the fuel of a candle for at least one (1) minute. In other embodiments, the wick 5 may provide and sustain the fuel of a candle for less than one minute or more than one minute. In some embodiments, the wick 5 self-extinguishes once a flame comes in contact with the body 10.

According to an embodiment of the invention, the edible wicking material, comprises an almond. The drupe seed of an almond tree contains natural oils that are flammable and slow-burning. Using an edible material such as the almond for a wick in a candle ensures the entire candle is edible and non-toxic. Other edible materials can be treated with edible oils, shaped, and used as such. In one embodiment, the term "seed" is used interchangeably with the term "nut." However, either usage is not intended to limit or preclude the use of the other. Other types of nuts may also be used as a wick. One skilled in the art should recognize that the wick portion of the candle is not limited to the almond, but can also be made from other nuts/seeds, such as, without limitation, peanut, cashew, hazelnuts, macadamias, pecans, pine nuts, pistachios or walnuts. In other embodiments, the edible wick comprises soy or tofu. The wick may be treated with natural, edible oils or the wicks may be left untreated. In some embodiments, a plurality of wicks made from one or more nuts may be used to prolong the flame.

According to one embodiment of the invention an almond sliver is inserted near the top of the body of the candle. The sliver may be cut, or shaped with various angled sides to provide additional surface area, creating multiple surfaces for easier lighting and a prolonged flame. Alternatively, the almond sliver may be placed in the body mold when the liquid body material is added in order to provide a stronger bond between the body and the wick.

Figure 7D:
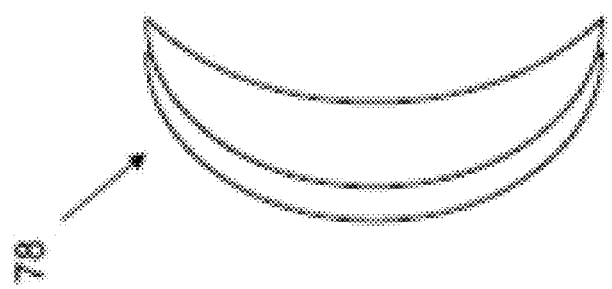
FIGS. 7A-7D are perspective views of various wick shapes in accordance with an embodiment of the invention.
Figure 7C:
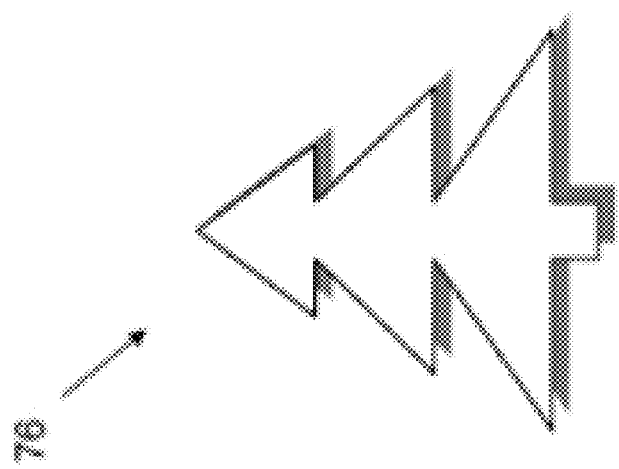
Figure 7B:
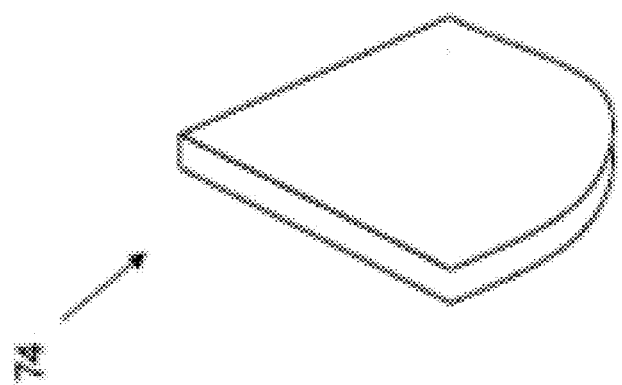
Figure 7A:
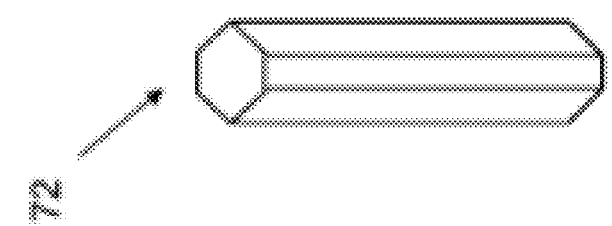

Other embodiments of the present invention may include shaped wicks, such as those shown in FIGS. 7A-D, to add another decorative element to the candle. FIG. 7A depicts an almond sliver 72 as described above. FIG. 7B includes a tear drop shaped wick 74. The tear drop shape closely resembles a natural flame that would appear on a traditional wick. FIG. 7C depicts a tree shaped wick 76 while FIG. 7D depicts a crescent shaped wick 78. Decorative shapes and sizes of the wick may be created by way of carving, stamping, cutting, or other shaping techniques. One skilled in the art should recognize that the invention is not limited to only those shapes detailed herein, but that any shape wick may be formed without deviating from the scope of the invention.

As the almond wick burns, the heat generated from the flame may melt the body and produce a by-product, or drippings, that may stream down the candle and on to the food product. As the combusted almond oil and seed (or other edible wicks), along with the body, are all edible materials, there is no danger of ingesting dangerous or toxic materials and no need to remove the drippings.

Although the embodiment described herein includes a chocolate molded body, one skilled in the art should recognize that any edible food product may be used, such as cake, cookie, ice cream, frozen yogurt, frozen fruit-bar, etc., without deviating from the scope of the invention. Further, the embodiments described herein are not limited to a chocolate flavored base, but may include any flavor as a base for the body. The height of the candle can range from about three to four inches in height by about two to three inches in width. One skilled in the art should recognize that the invention is not limited to traditional sizes and may be larger or smaller without deviating from the scope of the invention.

Figure 8:
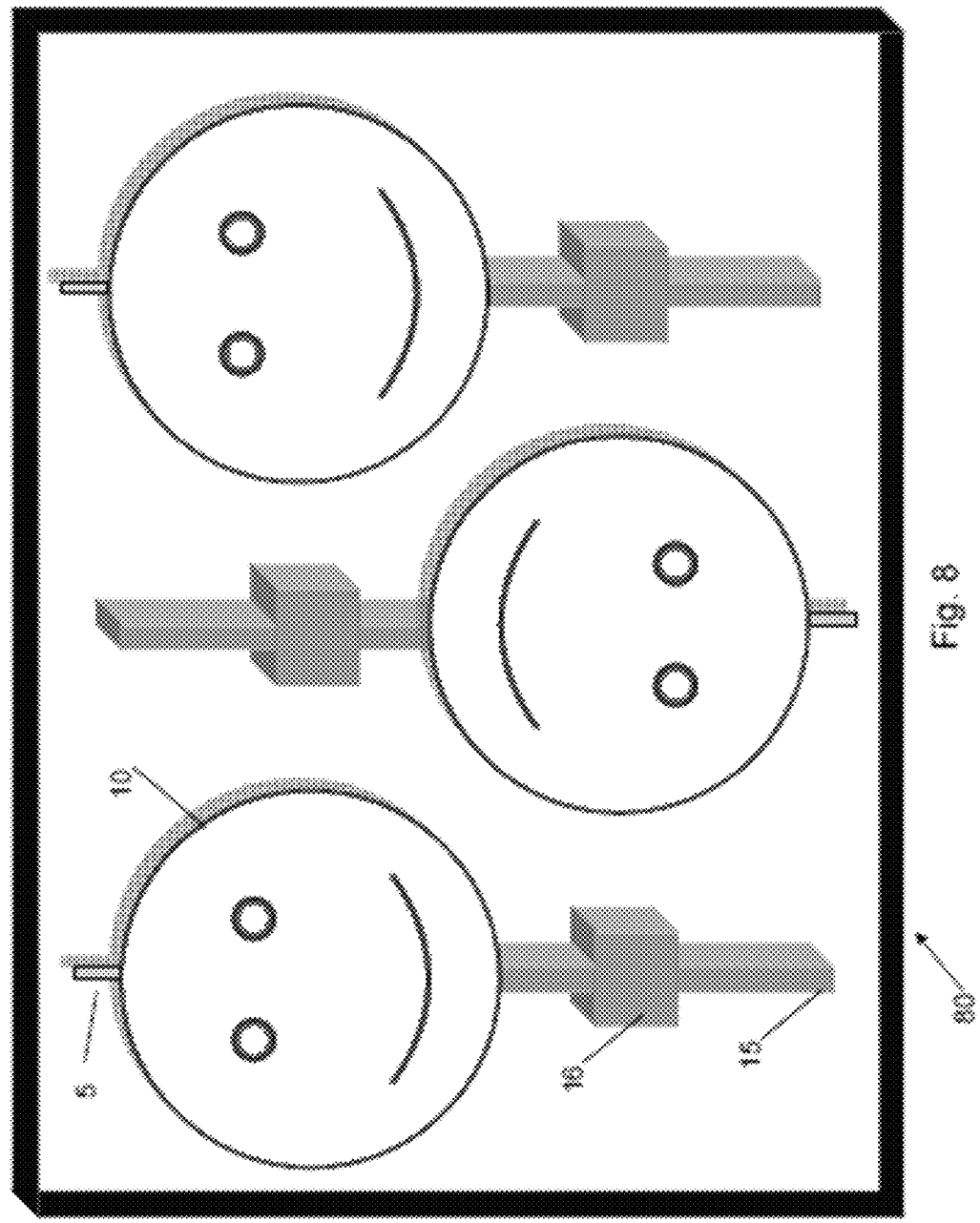
FIG. 8 depicts a lollipop candle mold sheet in accordance with an embodiment of the invention.

According to another embodiment of the invention, edible candles may be styled after lollipops or bonbons. FIG. 8 depicts a mold sheet of lollipop candles 80 featuring a smiley-face symbol. The head of the candle resembles the smiley-face while the body, or pick, of the candle is elongated and thin. The mold features a rectangular cavity 16 surrounding a portion of the pick to facilitate removal of the molded candle without causing damage to the candle or breaking the pick. The picks may be formed or made out of any edible material that can sustain the weight of the candle head. Examples of edible pick materials include, without limitation, chocolate, cake, pretzel or hardened candy. In one embodiment, phyllo dough (also referred to as filo dough), is rolled into tight tubes to form a pick or stick for insertion into a suitable confection. The sticks or picks can be formed from dough in one embodiment.

Cavities for the placement of the edible wicks are also included according to one embodiment of the invention. Lollipop candles may be molded from any letter, character, symbol, figurine, icon or logo. Examples of lollipop candle heads may include ice-cream cones, stars, decorative shapes, cartoon faces, logos, icons, or any other recognizable shapes. Bonbons may also be created in generally round shapes having an edible wick molded or affixed to the top. Bonbon shaped candles may include a pick as described above, or alternatively may include a flattened bottom portion allowing the candle to be placed on top of a food piece without having to insert a portion of the candle into the piece.

Figure 9:
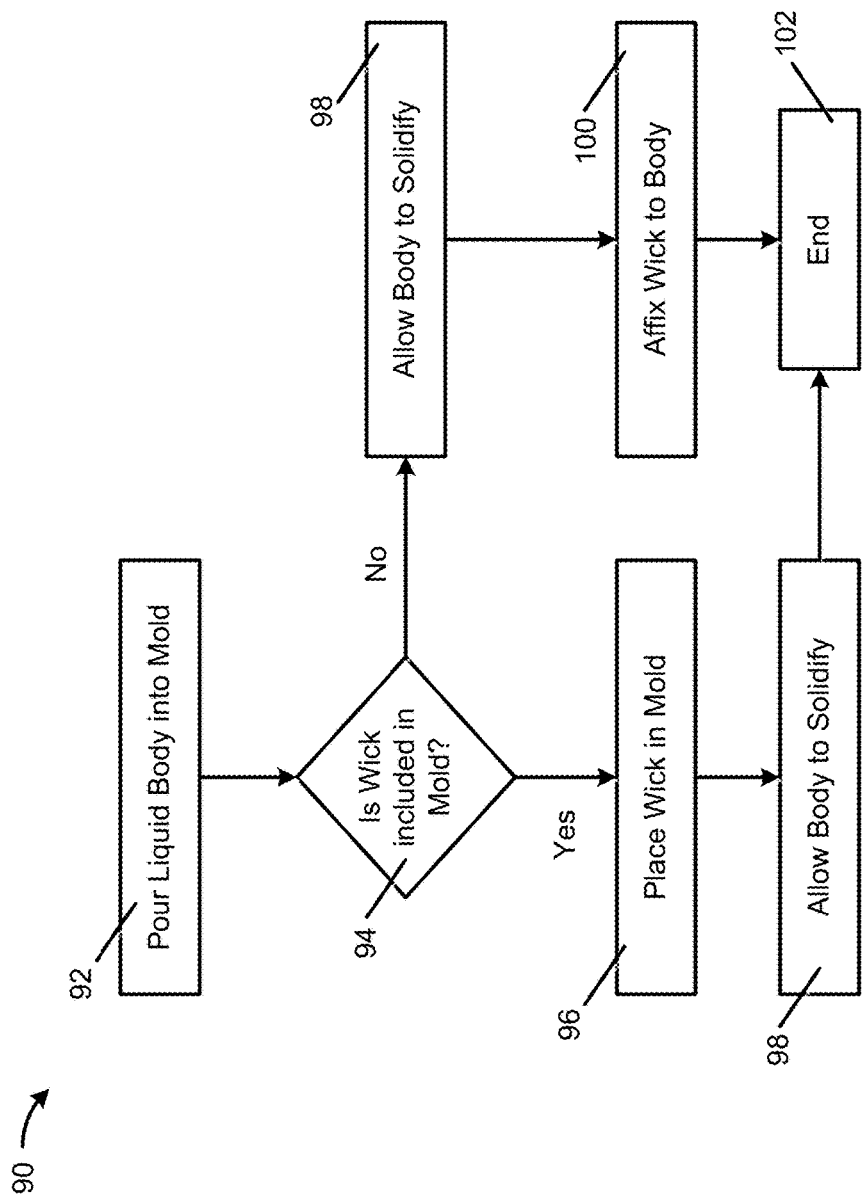
FIG. 9 is a block diagram of a method in accordance with an embodiment of the invention.

According to another embodiment of the invention, various methods for selecting nuts and processing nuts or nut components via an experimentally determining manufacturing process to generate edible wicks or other edible combustible confection components. In addition, various methods for manufacturing an edible candle are disclosed. As depicted in FIG. 9, the method 90 includes pouring the liquid body material into the body mold 92. The mold may define a depression 94, or divot, for placement of the wick 96, allowing the wick to become affixed the candle as the liquid body solidifies 98. Alternatively, if the mold does not include a depression for the wick, the wick may be affixed at a later time 100 after the liquid body has solidified 98. Once the liquid body is solidified 98 and the wick is affixed the edible candle is complete 102. As a further alternative, the wick may be heated prior to affixing to the body. The heat applied to and maintained by the wick may partially melt a portion of the body allowing the wick to penetrate the body. As the wick cools, the body re-solidifies around the wick providing a fixed attachment.

Further, while some embodiments described herein are described as candles for use on top of food products, one skilled in the art should recognize that other types of confections, in addition to candles, such as scented or decorative candles, or marshmallow sticks, cupcakes, and other confections as described herein without deviating from the scope of the invention.

Selection and Processing of Nuts and Food Stuffs to Generate Edible Wicks

Figure 10A:
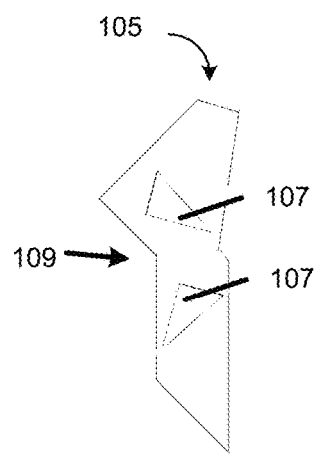
FIG. 10A is a schematic diagram of an exemplary edible wick and various geometric features according to an illustrative embodiment.

Through repeated testing and evaluation of the burn times and burnability, various attributes and properties have been identified to improve the burning of edible wick embodiments. FIG. 10A shows an exemplary edible wick 105 that has been formed by cutting and shaping an almond sliver. Other materials can be used for the edible wick as disclosed herein including other nut portions, drupes, seeds, and other flammable edible materials.

Figure 10B:
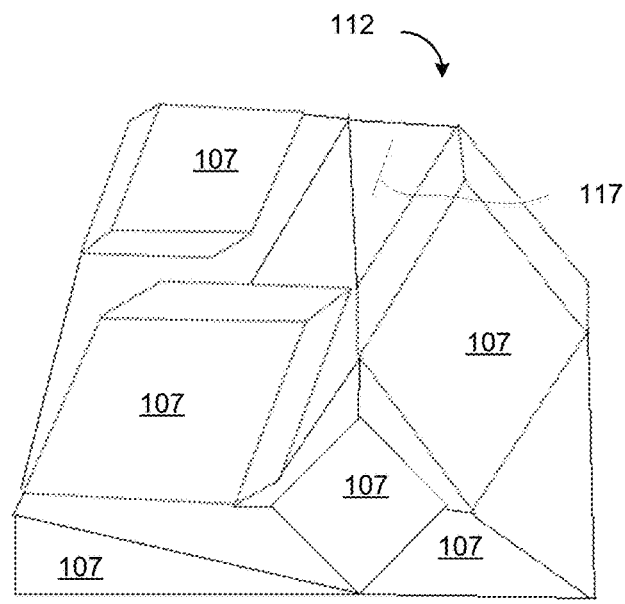
FIG. 10B is a schematic diagram of a zoomed in view of various facets and scoring of an edible wick according to an illustrative embodiment.

Although a three-dimensional object, the wick 105 is shown in two dimensions in FIG. 10A. The wick 105 has various facets 107. In addition, the wick 105 has various sharp edges or vertices 109. The facets and the edges are formed to increase the surface area for burning and oil release. The facets are flat surfaces that are formed through various faceting processes. FIG. 10B shows an exemplar magnified view of various facets 107 and edges of wick 105. The creation of such facets and edges has been found to increase burn time and facilitate easier light of the wick 105. The facets can also be scored as shown by scored region 117. Scored regions are less than about 100 scored regions in one embodiment.

Figure 10C:
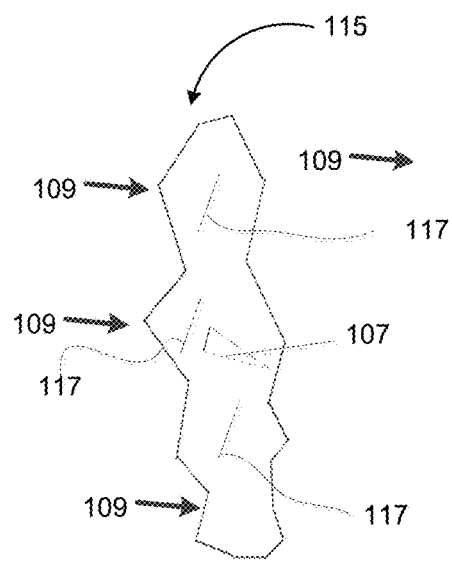
FIG. 10C is a schematic diagram of an exemplary edible wick and various geometric features including facets and scoring according to an illustrative embodiment.

In addition, to shaping the surface of an edible item such as a nut, seed, or drupe, to create facets and vertices as part of the process of creating a wick, scoring is also implemented with regard to the surface of edible item. FIG. 10C shows an exemplary wick 115 suitable for use with various confections as described herein. The wick 115 includes various vertices 109 and facets 107. In addition, the surface of the wick 115 and the associated facets forming the surface have been scored with a blade or other suitable tool or machine. The scored regions 117 are shown in various exemplary places on the surface of the wick 115. It is desirable to score the wicks as part of the process of creating an edible wick because scoring facilitates additional flammable oil release and distribution on the surface of the wick 115. This applies in the cases of almonds and other oil containing edible materials. In general, performing cutting and shaping to increase facets and surface area as well as scoring the nut surface is advantageous in terms of initial lighting and overall burn time. In addition, toasting the wick after cutting, shaping, and scoring has been found to further increase oil release and burn time for various edible wick embodiments including wicks made from almonds. The benefits of scoring prior to packaging increase burn times and lighting success with regard to the edible candle containing confection. Accordingly, a toasted, facetted scored edible wick is desirable for use in edible birthday candles and other edible confections.

Figure 11:
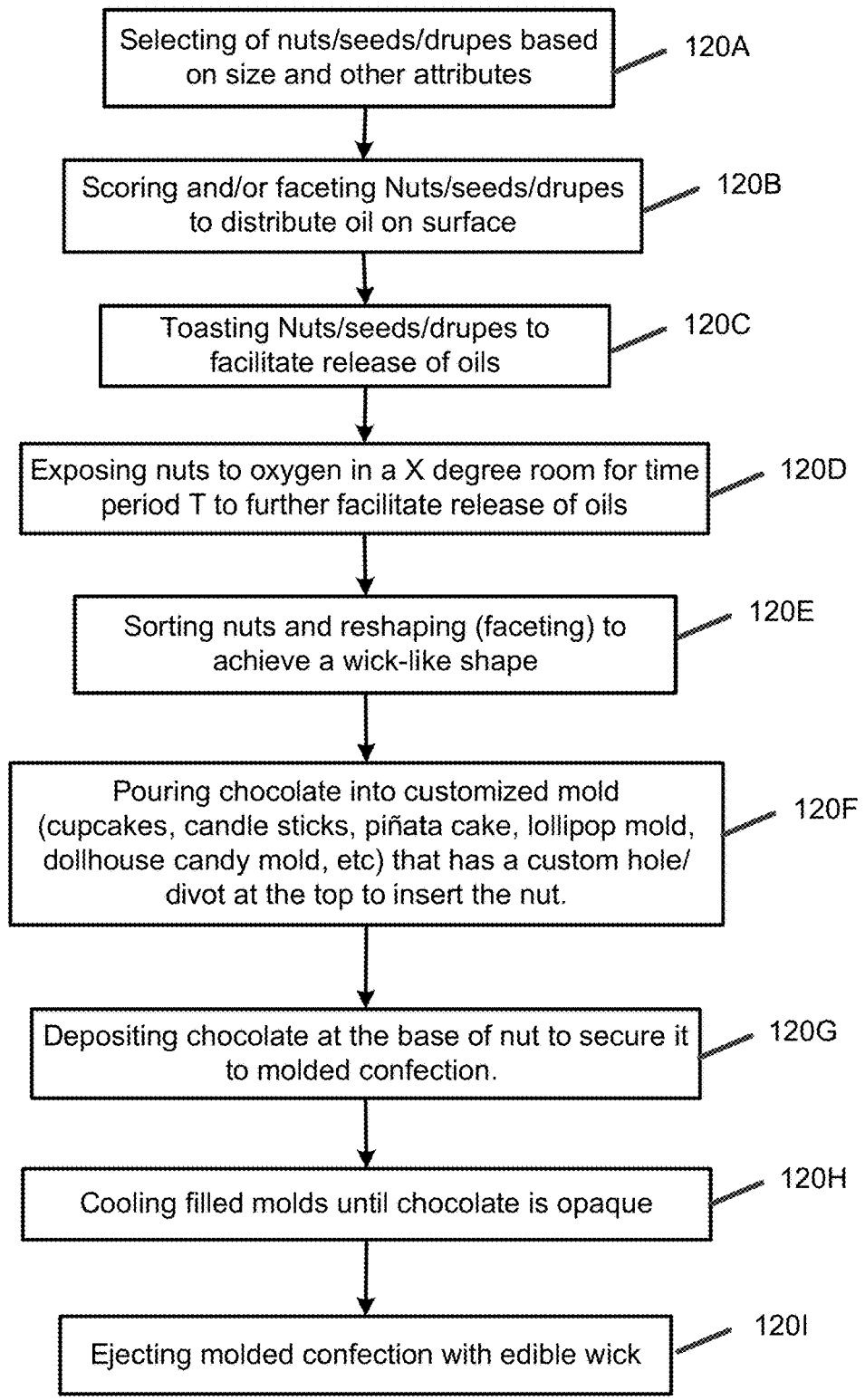
FIG. 11 is a flowchart illustrating an exemplary method for manufacturing an edible candle.

FIG. 11 is a flowchart illustrating an example method 115 for manufacturing an edible candle. The method includes a first step 120A of selecting nuts, seeds, or drupes based on a variety of attributes to create an edible wick. In some embodiments, these attributes may be selected from one of a group of size, flammability, ability to mold, ability cut or carve, or other desired characteristics. In some embodiments, the selected nut, seed, or drupe is selected to have a size of at least one inch in length. Temperature control and nut drying are also important factors to improve lighting and burn time.

In a preferred embodiment, the selected nut, seed, or drupe is stored in an airtight container or bah in a cool, dark place or refrigerator in order to preserve freshness and seal in the oils. In some embodiments, the selected nuts may be used to create an edible wick. In other embodiments, the nuts may be used to mold or flavor other parts of the edible candle. The second step 120B includes scoring the nuts, seeds, or drupes to distribute oil on the surface of the item. A third step 120C includes toasting the nuts, seeds, or drupes to facilitate the release of oils. The fourth step 120D includes exposing the nuts to oxygen in a temperature controlled room at X degrees for a selected period of time T to further facilitate the release of oils. In some embodiments, the temperature in the room X may be about 70 degrees Fahrenheit. X can be less than about 90 degrees Fahrenheit in one embodiment. T can be about 12 hours or more. T can be about 24 hours or more. In one embodiment, T is less than about 6 hours. In one embodiment, T is less than about 3 hours. In other embodiments, the temperature in the room X may be between 65 degrees Fahrenheit and 70 degrees Fahrenheit. In yet other embodiments, the temperature X in the room may be any temperature below 70 degrees Fahrenheit.

Still referring to FIG. 11, in some embodiments, the nut, seed, or drupe is placed in the temperature controlled room for one day to further facilitate the release of oils. In other embodiments, the nut, seed, or drupe is placed in the temperature controlled room for thirty (30) days to further facilitate the release of oils. The fifth step 120E includes sorting the nuts, seeds, or drupes and reshaping them into an elongate slice of nut to achieve a wick-like shape.

In some embodiments, the reshaping of the nuts, seeds, or drupes includes cutting or carving the items. In other embodiments, reshaping of the nuts, seeds, or drupes includes burning, filing, or breaking. In some embodiments, the fifth step comprises cutting the elongate slice of the nut to form a plurality of angled sides to provide additional surface area for easier lighting and a prolonged flame The sixth step 120F includes pouring an edible material into a customized mold to create an elongate molded candle body with a customized hole to form a divot on top. In some embodiments, the edible material comprises chocolate, vanilla, strawberry, cake, cookie, ice cream, frozen yogurt, or a frozen fruit.

In some embodiments, the edible material comprises a flavor. In some embodiments, the flavor may be selected from a group consisting of milk chocolate, dark chocolate, white chocolate, fudge, cherry chocolate, mint chocolate, mocha chocolate, orange, apple, pineapple, mango tangerine, cherry, melon, plum, apricot, peach, lemon, lime, cranberry, boysenberry, raspberry, strawberry, blackberry, blueberry, grape, coconut or banana, peppermint spearmint, almond amaretto, walnut, pecan, pistachio, hazelnut or peanut mocha, vanilla, butterscotch, rum, and liqueur. In some embodiments, the edible material may be decorated with edible gold dust, colored or metallic sugar sprinkles, sugar pearls and colored liquid chocolate. In some embodiments, the customized mold may be in the shape of candles, letters, numbers, or symbols. In other embodiments, a set of flat or 3D molds may be created to combine into a single object including, but not limited to, a doll house, a box, an instrument, and various plants or trees.

A seventh step 120 G includes depositing the edible material at the base of the nut, seed, or drupe to secure it to the edible candle. In some embodiments, the nut, seed, or drupe is heated before it is secured to the edible candle. The eighth step 120H includes cooling the filled molds until the edible material is opaque. In some embodiments, the molds are cooled for one (1) to two (2) minutes. In other embodiments, the molds are cooled for a variable amount of time until the edible material turns opaque in color. The ninth step 120I includes ejecting the molded edible candle with the edible wick. In some embodiments, the molded edible candle is ejected by heating the outside of the customized mold. In other embodiments, the molded edible candle is ejected by turning the mold over.

As an alternate embodiment, the process of making a wick starts with whole raw nuts. Whole raw nuts stay fresh the longest. To maintain freshness and maximize the release of its natural oils for a functional candle, the nuts, seeds, or drupes selected may be cut, scored, and toasted. Then, the nuts may be exposed to oxygen in a room at 70 degrees for at least one day to release the oils. The nuts will then be sorted and reshaped to resemble a wick. An edible material is poured into a customized mold (cupcakes, candle sticks, piñata cake, lollipop mold, dollhouse candy mold, etc.) that has a custom divot at the top to insert the nut to create the edible candle. A second edible material is then spooned at the base of nut to secure its placement. The molds are then placed in freezer until the mold is opaque. In one embodiment, the molds are chilled in this manner for 1 to 2 minutes.

The mold with the edible candle with the nut wick affixed is turned over and the edible candle slides easily out of mold on to a clean surface. The edible candle may then be decorated immediately. Timeliness is advantageous to this process because too much exposure to oxygen can decrease burning time. The wicks are then scored once more to increase burn time. If the wicks break while being scored, a knife dipped in scalding water is wiped dry and used to melt the top of the edible candle and release wick out of its pace. A new wick is affixed from the pretreated nut selection. A toothpick-like tool will paint the area with more edible material and, after placement, more of the second edible material is added at the base of nut to secure its placement.

Once decorations dry, the candles are placed in a custom two part "clamshell" case or one part case and heat sealed in plastic candy bags. The edible candles are placed in a cushioned designer box with signage that is heat sealed to preserve freshness. That box is placed inside a mailing box with receipt and ice pack and mailed away.

Figure 12:
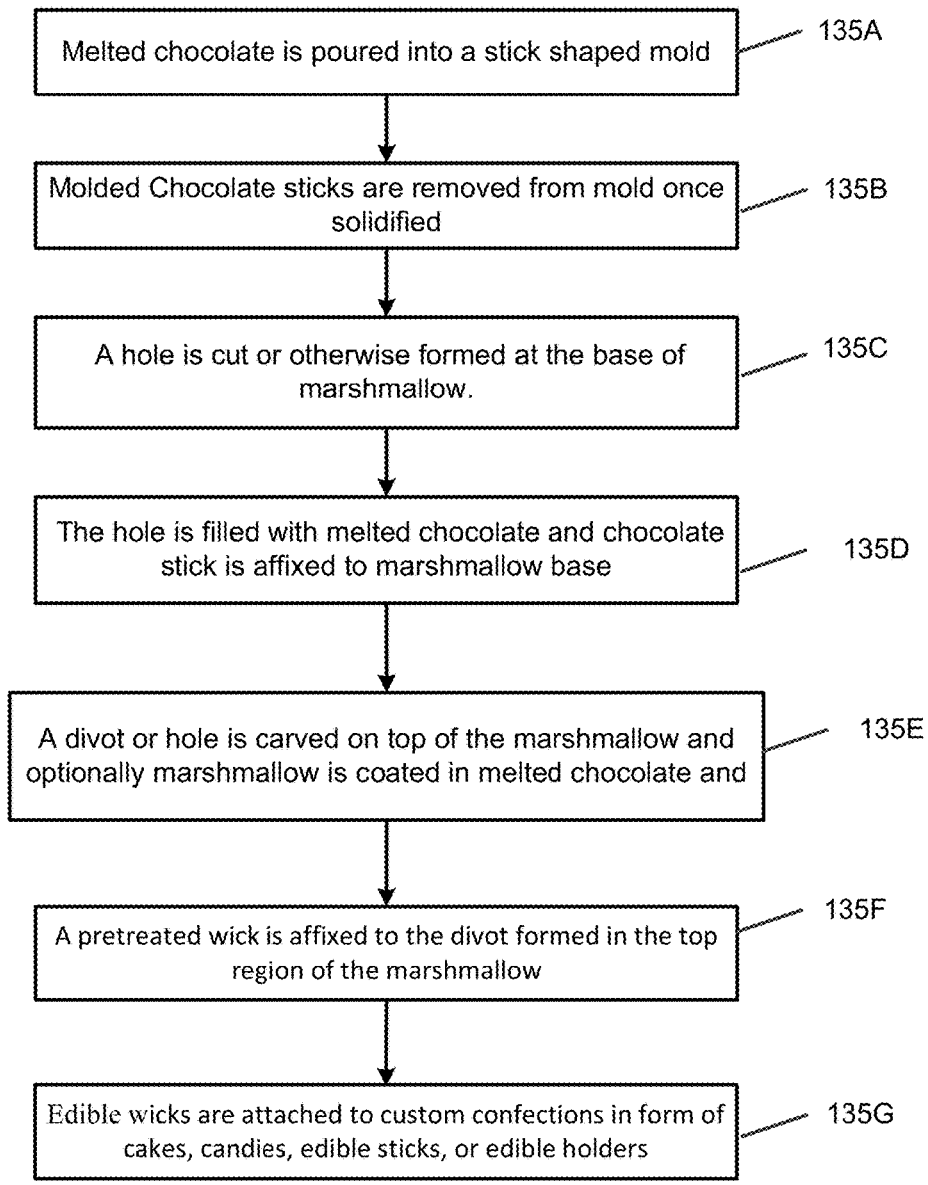
FIG. 12 is a method describing various processing steps for a candle stick confection having an edible wick according to an illustrative embodiment.

FIG. 12 is a flowchart illustrating an example method for manufacturing an edible candle. The method includes a first step 135A of pouring an edible material into a mold. In some embodiments, the edible material comprises chocolate, vanilla, strawberry, cake, cookie, ice cream, frozen yogurt, or a frozen fruit. In some embodiments, the edible material comprises a flavor. In some embodiments, the flavor may be selected from a group consisting of milk chocolate, dark chocolate, white chocolate, fudge, cherry chocolate, mint chocolate, mocha chocolate, orange, apple, pineapple, mango tangerine, cherry, melon, plum, apricot, peach, lemon, lime, cranberry, boysenberry, raspberry, strawberry, blackberry, blueberry, grape, coconut or banana, peppermint spearmint, almond amaretto, walnut, pecan, pistachio, hazelnut or peanut mocha, vanilla, butterscotch, rum, and liqueur. In some embodiments, the edible material may be decorated with edible gold dust, colored or metallic sugar sprinkles, sugar pearls and colored liquid chocolate.

In some embodiments, the mold is stick shaped. In other embodiments, the mold may be in the shape of letters, numbers, or symbols. In yet other embodiments, a set of flat or 3D molds may be created to combine into a single object including, but not limited to, a doll house, a box, an instrument, and various plants or trees. A second step 135B includes removing the edible candle from the mold once the edible material has solidified. In some embodiments, the edible material is solidified for one (1) to two (2) minutes. In other embodiments, the edible material is solidified for a variable amount of time until the edible material turns opaque in color. In some embodiments, the edible candle is removed by turning the mold over. In other embodiments, the edible candle is removed by heating the outside of the mold. The third step 135C includes forming a hole at the base of a second edible material.

In some embodiments, the hole is cut of carved into the second edible material. In some embodiments, the second edible substance is a marshmallow. In other embodiments, the second edible material comprises chocolate, vanilla, strawberry, cake, cookie, ice cream, frozen yogurt, or a frozen fruit.

The fourth step 135D includes filling the hole with an edible material to affix an edible candle into the second edible material. In some embodiments, chocolate is used to adhere the edible candle into the second edible material. A fifth step 135E included creating a hole on the top of the second edible material. In some embodiments, the hole is created by cutting or carving the top of the second edible material. In some embodiments, the hole on the top of the second edible material is in the shape of a divot. In some embodiments, edible material is used to affix a wick on top of the second edible material. Alternatively, in other embodiments, no hole is created on top of the second edible material, and only edible material is used to affix a wick on top of the second edible material. The sixth step 135F includes affixing a pre-treated wick to the top of the second edible material. In some embodiments, the pre-treated wick is affixed to a hole on the top of the second edible material. In one embodiment, edible wicks are attached to custom confections in form of cakes, candies, edible sticks, or edible holders per step 135G.

Figure 14A:
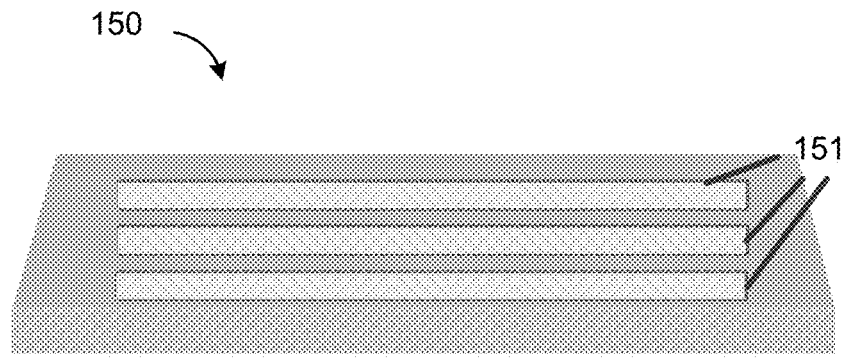
FIGS. 14A and 14B are exemplary molds for preparing stick confections according to an illustrative embodiment.
Figure 14B:
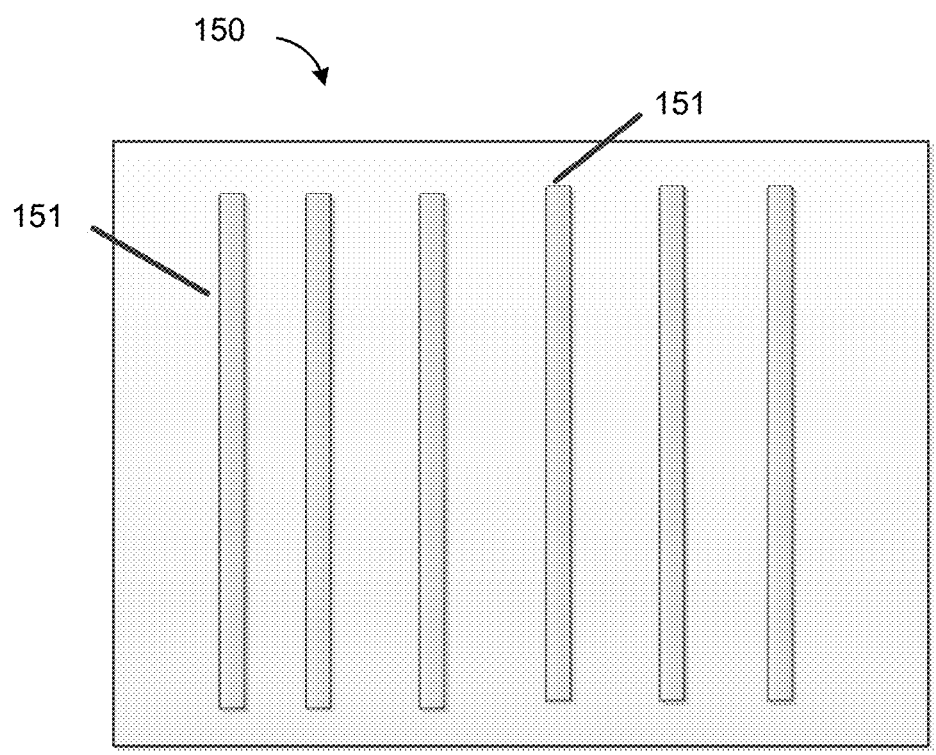

The method in FIG. 12 may be sued to create a "smores" edible candle. Melted chocolate is poured into a custom chocolate mold 150 in the form of a stick as illustrated in FIGS. 14A-14B. Once solidified, the chocolate stick is removed from the mold. These sticks are affixed to a giant marshmallow (homemade or pre-bought) by carving out a small divot or hole at the base of marshmallow. The hole is filled with melted chocolate and chocolate stick is affixed to marshmallow base. Once cooled, a tiny divot/hole is carved at the top and the marshmallow is covered in melted chocolate and the pretreated wick is affixed and rolled in graham cracker crumbs and placed in refrigerator to cool.

Once removed, the nut is lightly scored and immediately placed in candy trays and heat sealed. In an alternate embodiment, the chocolate stick may be replaced with a filo pastry stick. The filo pastry is rolled out and painted with butter and cinnamon, cut into sticks and placed in the oven. When done, the sticks are covered in melted chocolate and, once cooled, affixed to the marshmallow and wick. In some embodiments, handmade chocolate truffles are affixed to the chocolate sticks or chocolate dipped pastry sticks.

Figure 13D:
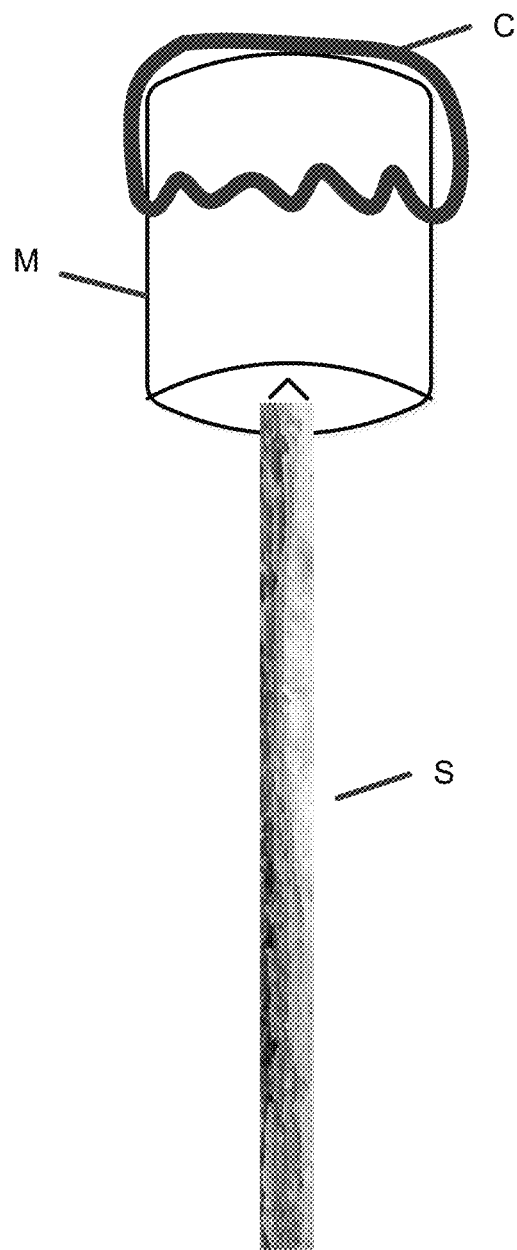

FIGS. 13A-13E depict one embodiment of the edible candle 140 in a lollipop shape. FIG. 13A is a perspective view of one embodiment of the edible candle. The edible candle 145 includes an elongate molded candle body M comprising a solidified edible material. The elongate molded candle body M may be in a shape selected from the group including cylinders, rectangular prisms, pyramids, cones, letters, numbers, symbols, or any other three-dimensional shape.

In some embodiments, a set of flat or 3D molds may be created to combine into a single object including, but not limited to, a doll house, a box, an instrument, and various plants or trees. In some embodiments, the solidified edible material of the elongate molded candle body M comprises a chocolate truffle. In one embodiment, the sticks are enrobed or dipped into melted chocolate and once cooled, affixed to marshmallow M and wick. Handmade chocolate truffles M are affixed to chocolate sticks or chocolate dipped pastry sticks.

In other embodiments, the solidified edible material comprises chocolate, cake, cookie, ice cream, frozen yogurt, or a frozen fruit. In some embodiments, the solidified edible material comprises a flavor. In some embodiments, the flavor may be selected from a group consisting of milk chocolate, dark chocolate, white chocolate, fudge, cherry chocolate, mint chocolate, mocha chocolate, orange, apple, pineapple, mango tangerine, cherry, melon, plum, apricot, peach, lemon, lime, cranberry, boysenberry, raspberry, strawberry, blackberry, blueberry, grape, coconut or banana, peppermint spearmint, almond amaretto, walnut, pecan, pistachio, hazelnut or peanut mocha, vanilla, butterscotch, rum, and liqueur. In some embodiments, the solidified edible material may be decorated with edible gold dust, colored or metallic sugar sprinkles, sugar pearls and colored liquid chocolate. In the illustrated embodiment, a second edible material C covers the top of the elongate molded candle body. In some embodiments, the second edible material is chocolate.

In other embodiments, the second edible material may be frosting, icing, sugar paste, frozen yogurt, or frozen fruit. In other embodiments, no second edible material covers the top of the elongate molded edible candle M. In the illustrated embodiment, an edible wick W is configured on top of the elongate molded edible candle M. The edible wick may comprise of slice of the edible wick may be selected from a group comprising almonds, cashews, hazelnuts, macadamias, pecans, pistachios, and walnuts. In other embodiments, the edible wick comprises soy or tofu. In some embodiments, the edible wick is configured on top of the elongate molded edible candy M at a divot or hole on the top of the candle body. In some embodiments, the edible W is affixed on top of the elongate molded edible candle M by the second edible material C.

FIGS. 13B-13D are perspective views of the edible candle 147 in a lollipop shape. A stick S is attached to the elongate molded edible candle M at a bottom surface of the candle body. As illustrated in FIG. 13C, in some embodiments, the stick S is affixed to the bottom of the elongate molded edible candle M at a divot or hole on the bottom surface of the candle body. In some embodiments, the stick may be affixed to the bottom of the elongate molded edible candle M with a second edible material.

As illustrated in FIG. 13D in some embodiments, the stick S may comprise a rigid edible material. In some embodiments, the rigid edible material edible material comprises chocolate, chocolate truffles, pastry sticks, chocolate-dipped pastry sticks, cake, cookie, ice cream, frozen yogurt, or frozen fruit. In other embodiments, the stick S may comprise a non-edible material. to create completely edible lollipop. In one embodiment, the confections that include an edible wick, an edible solid material that supports the wick, and a edible handle or stick are used as candle sticks or lollipops. The stick attached to the chocolate, marshmallow, or other confection can serve as an embeddable base for the candle.

Figure 13E:
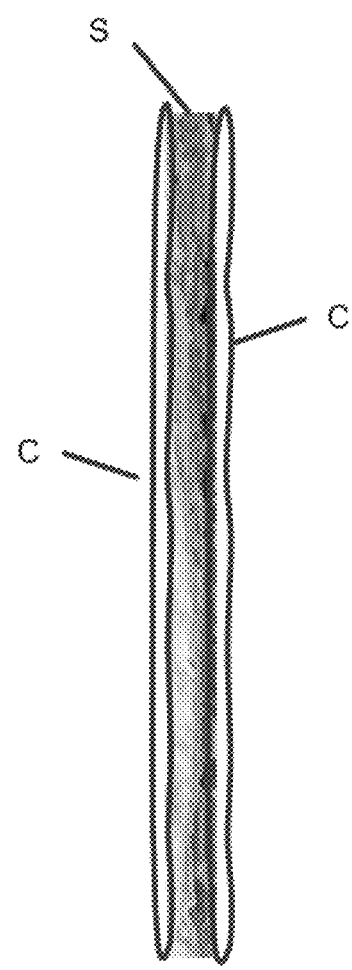
FIG. 13E is an exemplary edible stick for use with candle stick confections and other illustrative embodiments.

FIG. 13E is perspective view of the stick S comprising an edible material. In the illustrated embodiment, the stick S comprises a filo pastry base. In some embodiments, the filo pastry base of the stick S comprises a filling of butter and cinnamon. The filo pastry may then be cut into a stick shapes and baked. In some embodiments, the filo pastry may then be rolled or dipped in chocolate C. In other embodiments, the filo pastry stick S may be rolled or dipped in other edible material selected from a group of frosting, frozen yogurt, ganache, or other edible material.

FIGS. 14A and 14B are exemplary molds for preparing stick confections. As shown the stick molds 150 include a plurality of troughs or trenches to receive a material that will solidify and serve as an edible material. In one embodiment, chocolate or phyllo dough can be pressed into or poured into the molds. Other materials can be used to form the sticks. These sticks can be used for various embodiments disclosed herein such as the marshmallow, chocolate and other confections discussed herein. The phyllo dough sticks can be rolled or molded by pressing the dough or shaping it by hand. In one embodiment, the phyllo dough is painted with butter and cinnamon, cut into sticks and baked and then coated such as by rolling or dipping in a coating. The coating can be chocolate, sugar or one of the flavored confections described herein.

Figure 15:
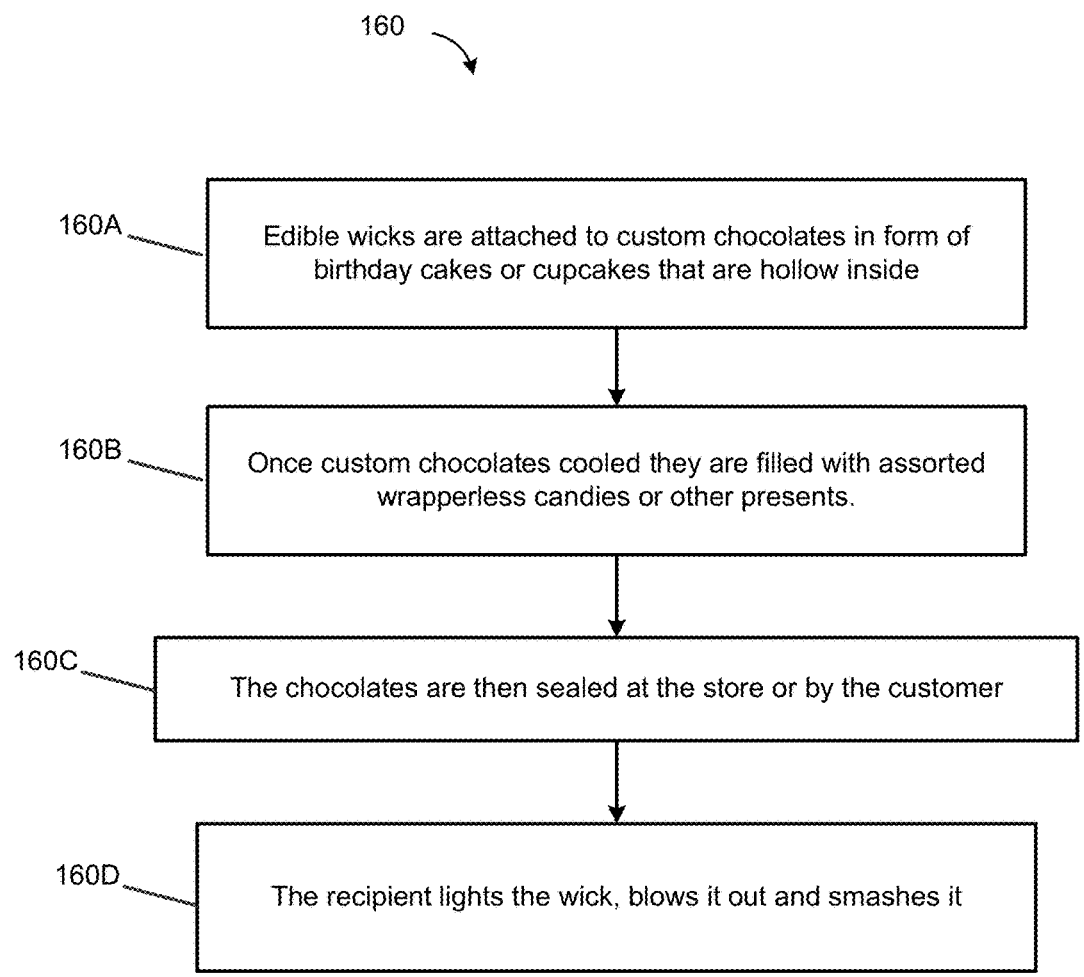
FIG. 15 is a method describing various processing steps for cake-shaped chocolate confections having an edible wick according to an illustrative embodiment.

FIG. 15 is a flowchart illustrating the method to make custom chocolates with an edible wick. Method 160 comprises attaching pretreated nuts to custom chocolates in the form of birthday cakes or cupcakes that are hollow inside 160A. Once cooled, the cakes are filled with assorted wrapperless candies and sealed by melted chocolate 160B. The chocolates may also hold other items such as engagement rings. The chocolates are then sealed 160C. In some embodiments, the chocolates may be sealed by the customers themselves using instructions on how to seal the chocolate with a heated knife in order to hide the contents inside. Finally, the recipient lights the wick, blows it out and smashes it per step 160D. The chocolate shells, wrapperless candies or confections and edible wick can be sold as a kit for use by a customer that they can assemble.

Figure 16A:
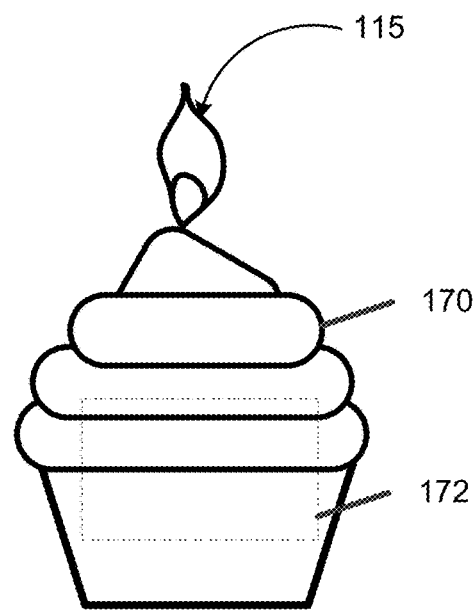
FIGS. 16A-16D illustrate possible embodiments of custom chocolates with pretreated nut wicks in the form of a cupcake, other cakes, and pies.
Figure 16B:
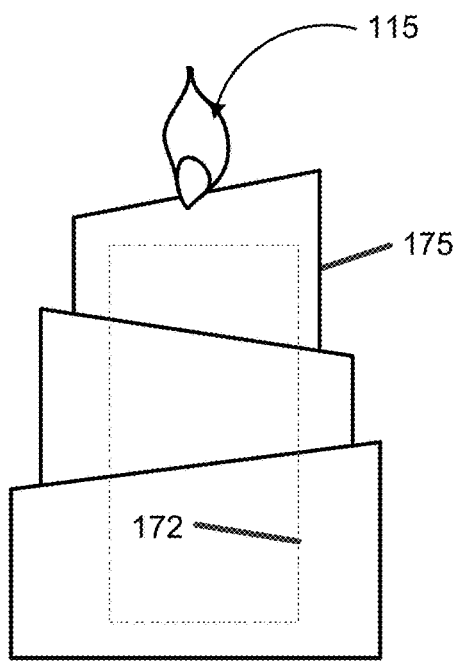
Figure 16C:
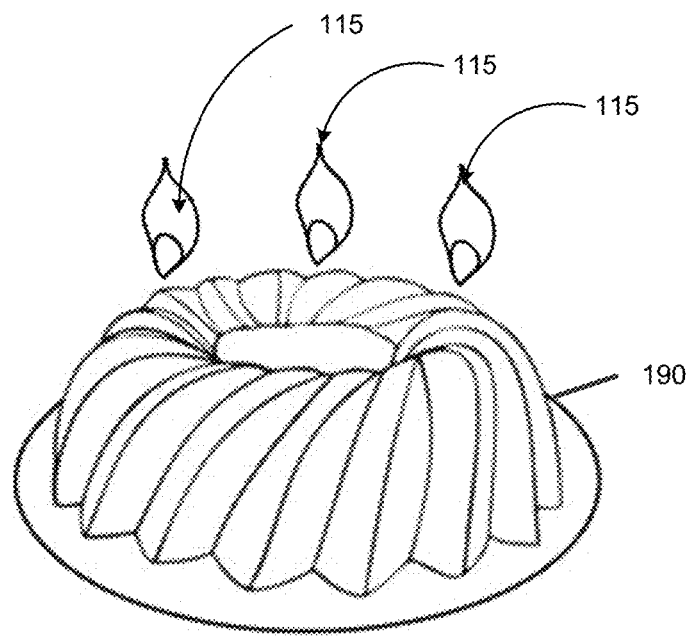
Figure 16D:
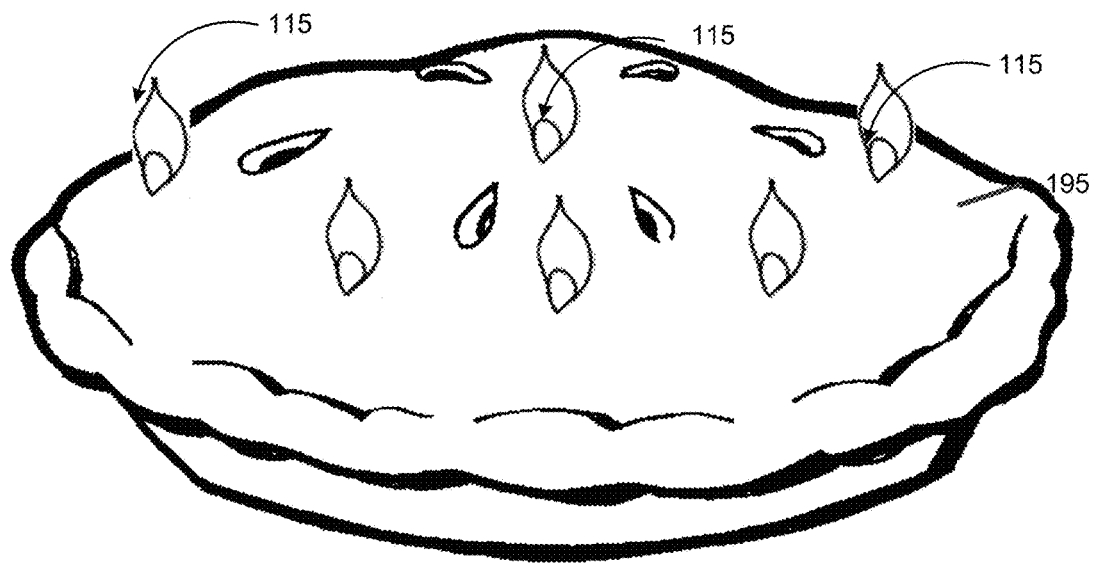

FIGS. 16A and 16B are examples of confections 170, 175 that include an edible wick 115 and that can include a molded hollow chamber 172. The hollow chamber 172 can be filled with candy, toys, prizes, or other material. The hollow chamber 172 may then be covered with an edible cap. In some embodiments, edible cap may comprise of chocolate. The edible cap may fit on the top or bottom of confections with a hollow center, such as the hollow center of the bundt cake in FIG. 16C. The edible cap may attach to just an edible wick or an entire edible candle. The confections of FIGS. 16A and 16B are examples of piñata confections and are designed to resemble cakes or cupcakes in various embodiments. Confection 170 is shaped to resemble a cupcake and confection 175 is shaped to resemble a cake such as birthday cake, a wedding cake, or other suitable cake. FIGS. 16C and 16D show a cake 190 and pie 195 embodiments that can be fabricated as piñata confections as described herein. Various edible wicks are shown disposed on such cake 190 and 195 pie embodiments.

In one embodiment, confections 170, 175 include wicks 115 that are prepared as discussed herein with scoring, toasting, and faceting. The wicks can also be processed with selective oxygen exposure as discussed herein. The prepared nuts are attached to custom chocolates in form of birthday cakes or cupcakes that are hollow inside. Once cooled, they are filled with assorted wrapperless candies and sealed by melted chocolate. In one embodiment, they are sold in sections to hide an engagement ring, etc. With such embodiments, a customer is given instructions on how to seal the chocolate (using heated knife) to co seal the ring or present.

In one embodiment, the disclosure relates to a chocolate candle with a scored, faceted, toasted edible nut, drupe, or seed wick. The wicks are scored once before toasting and then scored once more before packing in a sealed package to ensure maximized burn time.

In one embodiment, finished candles with affixed wicks 115 are placed in a custom two part "clamshell" case or one-part case and heat sealed in plastic candy bags. The chocolate candles are placed in a cushioned designer box with signage that is heat sealed to preserve freshness. That box is placed inside a mailing box with receipt and ice pack and mailed or otherwise delivered to customers.

In one embodiment, melted chocolate is poured into a custom chocolate mold in the form of a stick. Once solidified, they are popped out. These sticks are affixed to a giant marshmallow by carving out a tiny divot/hole at the base of marshmallow. The hole is filled with melted chocolate and chocolate stick is affixed to marshmallow base.

Once cooled, a tiny divot/hole is carved at the top and the marshmallow is enrobed/covered in melted chocolate and the wick (scored, toasted, cut and shaped to form facets) is affixed and rolled in graham cracker crumbs or another coating and then cooled. Once removed, the nut is lightly scored and immediately placed in candy trays and heat sealed to prevent further air exposure or drying. Sealing the confection in package to prevent loss of oil or over drying of the wick improves lighting and burn time.

The aspects, embodiments, features, and examples of the disclosure are to be considered illustrative in all respects and are not intended to limit the disclosure, the scope of which is defined only by the claims. Other embodiments, modifications, and usages will be apparent to those skilled in the art without departing from the spirit and scope of the claimed disclosure.

The use of headings and sections in the application is not meant to limit the disclosure; each section can apply to any aspect, embodiment, or feature of the disclosure.

Throughout the application, where compositions are described as having, including, or comprising specific components, or where processes are described as having, including or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the present teachings also include the specific quantitative value itself, unless specifically stated otherwise. As used herein, the term "about" refers to a ±10% variation from the nominal value It should be understood that the order of steps or order for performing certain actions is immaterial so long as the present teachings remain operable. Moreover, two or more steps or actions may be conducted simultaneously.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment", or the like, means that a particular feature, structure, or characteristic described in connection with the embodiment is included in at least one embodiment. Thus, appearances of the phrases "in various embodiments," "in some embodiments," "in one embodiment," or "in an embodiment", or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation given that such combination is not illogical or non-functional.

It should be appreciated that various aspects of the claimed disclosure are directed to subsets and substeps of the techniques disclosed herein. Further, the terms and expressions employed herein are used as terms of description and not of limitation, and there is no intention, in the use of such terms and expressions, of excluding any equivalents of the features shown and described or portions thereof, but it is recognized that various modifications are possible within the scope of the disclosure claimed. Accordingly, what is desired to be secured by Letters Patent is the disclosure as defined and differentiated in the following claims, including all equivalents.

While the invention has been described with reference to illustrative embodiments, it will be understood by those skilled in the art that various other changes, omissions and/or additions may be made and substantial equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. An edible candle comprising:
   a molded candle body comprising a solidified edible material;
   a divot configured on an upper surface of the molded candle body, wherein the upper surface is formed from the solidified edible material; and
   a toasted edible wick disposed in the divot.

2. The candle of claim 1, wherein the toasted edible wick comprises a plurality of scored regions, wherein the plurality of scored regions ranges from about 3 scored regions to about 10 scored regions.

3. The edible candle of claim 1 wherein the edible wick has been scored to define a plurality of scored regions.

4. The edible candle of claim 1 wherein the edible wick is a nut or drupe.

5. The edible candle of claim 1 wherein the edible wick is an almond.

6. An edible candle comprising:
   a molded candle body comprising a solidified edible material;
   a divot configured on an upper surface of the molded candle body, wherein the upper surface is formed from the solidified edible material;
   a toasted edible wick disposed in the divot; and
   an edible embeddable base extending from the molded candle body and unitary therewith, the edible embeddable base molded from the solidified edible material,
   wherein the solidified material comprises chocolate,
   wherein a width of the edible embeddable base is narrower than a width of the molded candle body.

7. The candle of claim 6 further comprising a cavity defined by the molded candle body, wherein the cavity is fillable with one or more confections or toys, wherein the edible wick is an almond sliver, the almond sliver is cut or shaped with various angled sides to provide additional surface area for easier lighting and a prolonged flame, wherein the almond sliver is scored at a plurality of locations, wherein the almond sliver is toasted.

8. An edible candle comprising:
   a molded candle body comprising a solidified edible material:
   a divot configured on an upper surface of the molded candle body, wherein the upper surface is formed from the solidified edible material;
   a toasted edible wick disposed in the divot; and
   an edible embeddable base extending from the molded candle body and unitary therewith, the edible embeddable base molded from the solidified edible material,
   wherein the edible wick is an almond,
   wherein the solidified material comprises chocolate,
   wherein the almond has been cut to define a plurality of angled sides to provide additional surface area,
   wherein the almond has been toasted to release flammable oils,
   wherein the almond has been scored to define a plurality of scored regions,
   wherein the plurality of scored regions ranges from about 3 scored regions to about 10 scored regions,
   wherein almond has an increased burn time relative to an uncut, unscored, untoasted almond.

* * * * *